US006519325B1

(12) United States Patent
Pildner et al.

(10) Patent No.: US 6,519,325 B1
(45) Date of Patent: Feb. 11, 2003

(54) CONTROL PANEL WITH DSL BYPASS CIRCUIT

(75) Inventors: Reinhart K. Pildner, Brampton (CA); Fabio J. D. Almeida, Mississauga (CA)

(73) Assignee: Digital Security Controls Ltd., Concord ( * ) Notice: Subject to any disclaimer, the term of this patent is extended or adjusted under 35 U.S.C. 154(b) by 200 days.

(21) Appl. No.: 09/709,362

(22) Filed: Nov. 13, 2000

(51) Int. Cl.[7] .............................................. H04M 11/04

(52) U.S. Cl. ........................ 379/51; 379/40; 379/93.05; 379/38; 379/399.01; 379/90.01

(58) Field of Search .............................. 379/38–40, 45, 379/50, 51, 93.02, 93.05, 387.01, 399.01, 441, 442

(56) References Cited

U.S. PATENT DOCUMENTS

| | | | | |
|---|---|---|---|---|
| 5,799,062 A | * | 8/1998 | Lazzara et al. ............... | 379/51 |
| 6,188,750 B1 | * | 2/2001 | Kiko .......................... | 379/38 |

* cited by examiner

*Primary Examiner*—Wing Chan

(57) ABSTRACT

A high frequency bypass circuit is advantageously used in combination with a security system control panel. The bypass circuit divides telephone signals provided to the circuit into a low frequency DC signal and a high frequency AC signal, typically used for data transfer. The DC signal is provided to the security system alarm control panel and the high frequency AC signal bypasses the control panel, and is connected to the private telephone system. Conventional phones on the private telephone system can be disconnected by the control panel while any high frequency signal continues uninterrupted.

6 Claims, 3 Drawing Sheets

CONTROL PANEL WITH DSL BYPASS CIRCUIT

BACKGROUND OF THE INVENTION

The present invention relates to control panels used with security systems, and in particular, to a control panel which disconnects conventional telephones from the publicly switched telephone network while allowing a high frequency AC signal to continue to be connected to the domestic telephone service.

Home security alarm control panels in most application share the use of the telephone service with the conventional telephone, however, the control panel has the capability seizing the telephone service and disconnecting the other devices on the service. In this way, the control panel can seize the telephone line to report alarm events to a security monitoring station even if the telephone line was in use.

This approach has worked well for many years and for most applications there is little inconvenience caused by the control panel seizing the telephone line upon demand. Often the household telephone devices are not in use when the security system seizes the line. For example, the security is most often armed when no one is present and therefore, if the control panel seizes the line, no inconvenience occurs as the line was not in use. Some security systems are used to monitor perimeter sensors, such as doors and windows while the occupants of the household are present. For example, the system may be armed at night. Once again, the use of the telephone has not been seriously impaired.

More recently, telephone communication companies have provided households with the capability to simultaneously receive and transmit the conventional low frequency DC signal used for telephone service, and a high frequency AC signal used for computer communications. A DSL modem can be connected to the telephone line at any point in the household and receive data over the telephone service while additionally allowing simultaneous use of the telephone in the normal manner. In some circumstances, the high frequency AC signal does provide a small noise component heard on the conventional telephone and a blocking filter can be provided for each telephone device.

Unfortunately, this dual usage of a single line telephone service in combination with a control panel sharing the service can cause problems. For example, if the user has decided to download a large file from a web server or other remote computer over the telephone service, if the control plane seizes the line, it will disconnect all devices in the household including the computer and as such, interrupt and corrupt the downloading of the data. To overcome this problem, the DSL modem could be connected to the telephone service upstream of the control panel, however, this is not always practical and it creates serious installation problems at additional cost.

The present invention provides a solution to overcome the above problems.

SUMMARY OF THE INVENTION

A high frequency bypass circuit for a telephone line according to the present invention, comprises Tip and Ring inputs, Tip and Ring security control panel outputs, and Tip and Ring high frequency outputs for a local telephone service. The circuit includes a DC branch connected to the Tip and Ring inputs which branch conducts low frequency telephone signals to the Tip and Ring security panel outputs. The circuit has an AC coupled high frequency branch connecting the Tip and Ring inputs to the Tip and Ring high frequency outputs.

With this arrangement, the AC coupled high frequency branch transmits DSL signals and other high frequency signals and blocks the transmission of low frequency audio telephone signals through the high frequency branch. The control panel which is connected immediately downstream of the bypass circuit, continues to control the low frequency DC telephone signals to the household telephone system. The control panel can seize this low frequency transmission path and disconnect the remaining service from the low frequency signal. In this way, the conventional phones on the household service are disconnected and the control panel functions in its normal manner.

The high frequency AC signal provided to the bypass circuit bypasses the control panel and continues to provide the high frequency component to the household service. In this way, if data is being transmitted over the telephone lines to or from a computer connected on the household telephone system, this transmission of data will continue and not be interrupted by the state of the control panel.

In a preferred aspect of the invention, the DC branch of the bypass circuit includes a filter which blocks the transmission of high frequency signals. Preferrably, this filter blocks transmission of any signal having a frequency above five KHz.

According to yet a further aspect of the invention, the high frequency branch includes capacitors for blocking the low frequency telephone signals.

According to yet a further aspect of the invention, a high frequency pass filter is used to block the low frequency audio telephone signals on the high frequency branch of the circuit.

A security control panel according to the present invention, has the high frequency bypass circuit included in the circuitry of the control panel. The control panel includes ring and tip inputs for connection to a telephone line for receiving DC low frequency telephone audio signals and AC high frequency telephone signals, a signal dividing circuit for conducting the DC low frequency telephone audio signals through a DC branch of the circuit and conducting the AC high frequency telephone signals through an AC branch of the circuit from the Tip and Ring inputs to the Tip and Ring outputs of the control panel used to connect with a household telephone system.

The control panel further includes a communication module and line seize switch arrangement. The line seize switch arrangement is controlled by the communication module. The line seize switch arrangement in one position connects the Tip and Ring inputs with the Tip and Ring outputs and in a second position, disconnects the Tip and Ring inputs from the Tip and Ring outputs. With this arrangement, the AC high frequency telephone signals are conducted by the AC branch between the Tip and Ring inputs and outputs and the DC low frequency telephone signals are selectively conducted between said Tip and Ring inputs and outputs depending upon the line seize switch arrangement.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
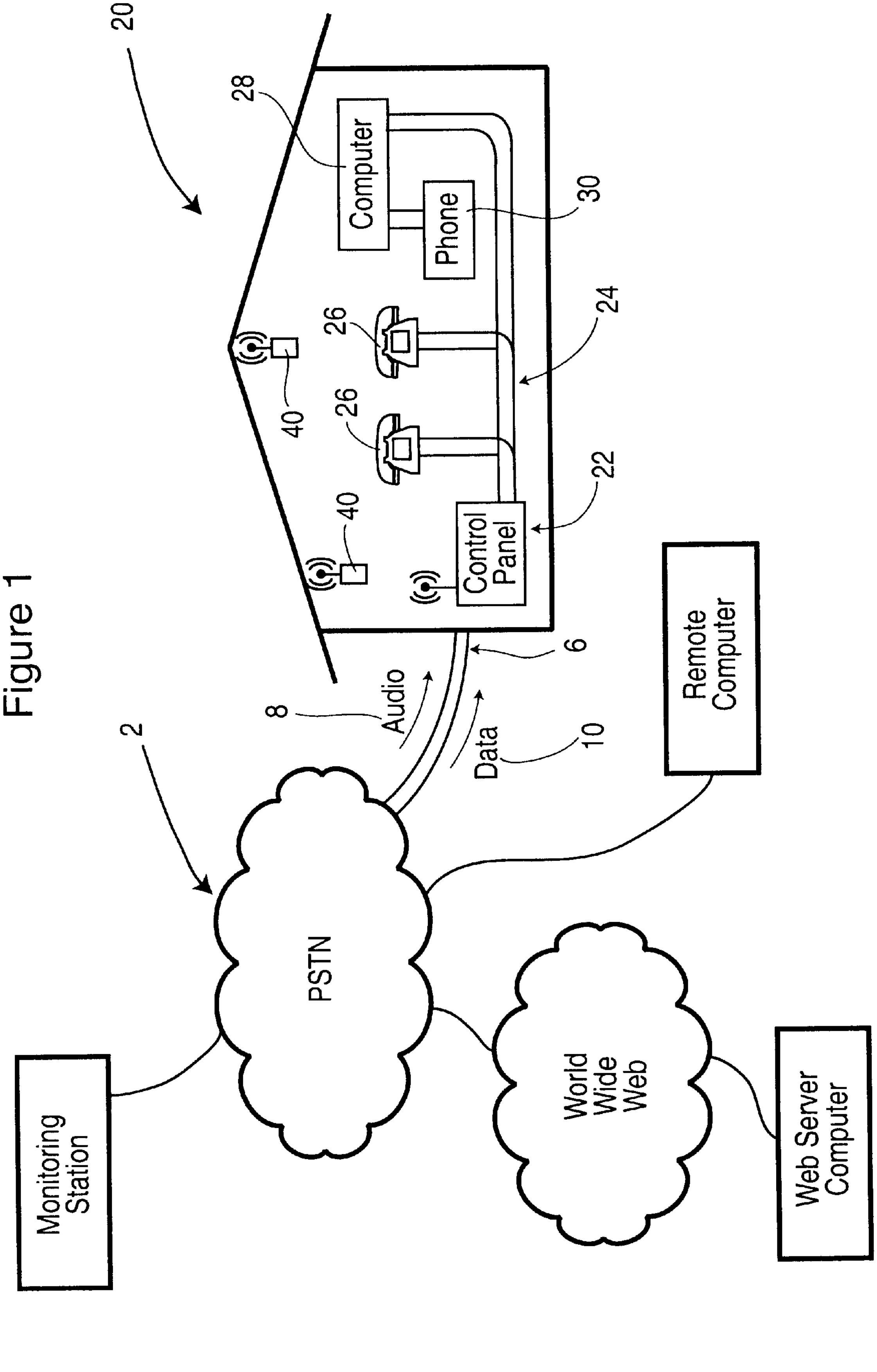
FIG. 1 is a schematic showing a publicly switched telephone network and a telephone service of a household.

The schematic of FIG. 1 shows a publicly switched telephone network 2 which provides a two wire single line telephone service 6 to the household indicated as 20. The household has a control panel 22 connected to the telephone service generally at the point of entry of the telephone service to the household. The control panel in conventional applications is located in front of the other telephone devices of the household system. The telephone network 24 of the household, shows a number of phones 26 located on the lines as well as the computer 28 having its own associated telephone 30.

The control panel 22 can be hardwired or connected by RF communications to various security detectors 40. The control panel 22 of FIG. 1 has a high frequency bypass circuit included and allows a high frequency signal to operate independently of the state of the control panel. The conventional low frequency telephone DC communication signals 8 are provided on the two wire single line service 06 to the control panel 22. The control panel has the capability of selectively isolating the household telephone network 24 from the low frequency DC communication signals. In the normal mode these low frequency DC telephone signals pass through the control panel and are provided to the network 24. If the control panel seizes the telephone service, the low frequency DC telephone communication signals 8 are terminated at the control panel.

The data communication telephone signals 10 are at a much higher frequency in excess of 60 Khz and these signals bypass the control panel through an AC bypass ranch to provide the signals to the network 24 regardless of the state of the control panel. With this arrangement, the control panel operates in its conventional mode with respect to the low frequency DC signals 8 and is transparent to the high frequency AC telephone communication signals 10.

Figure 2:
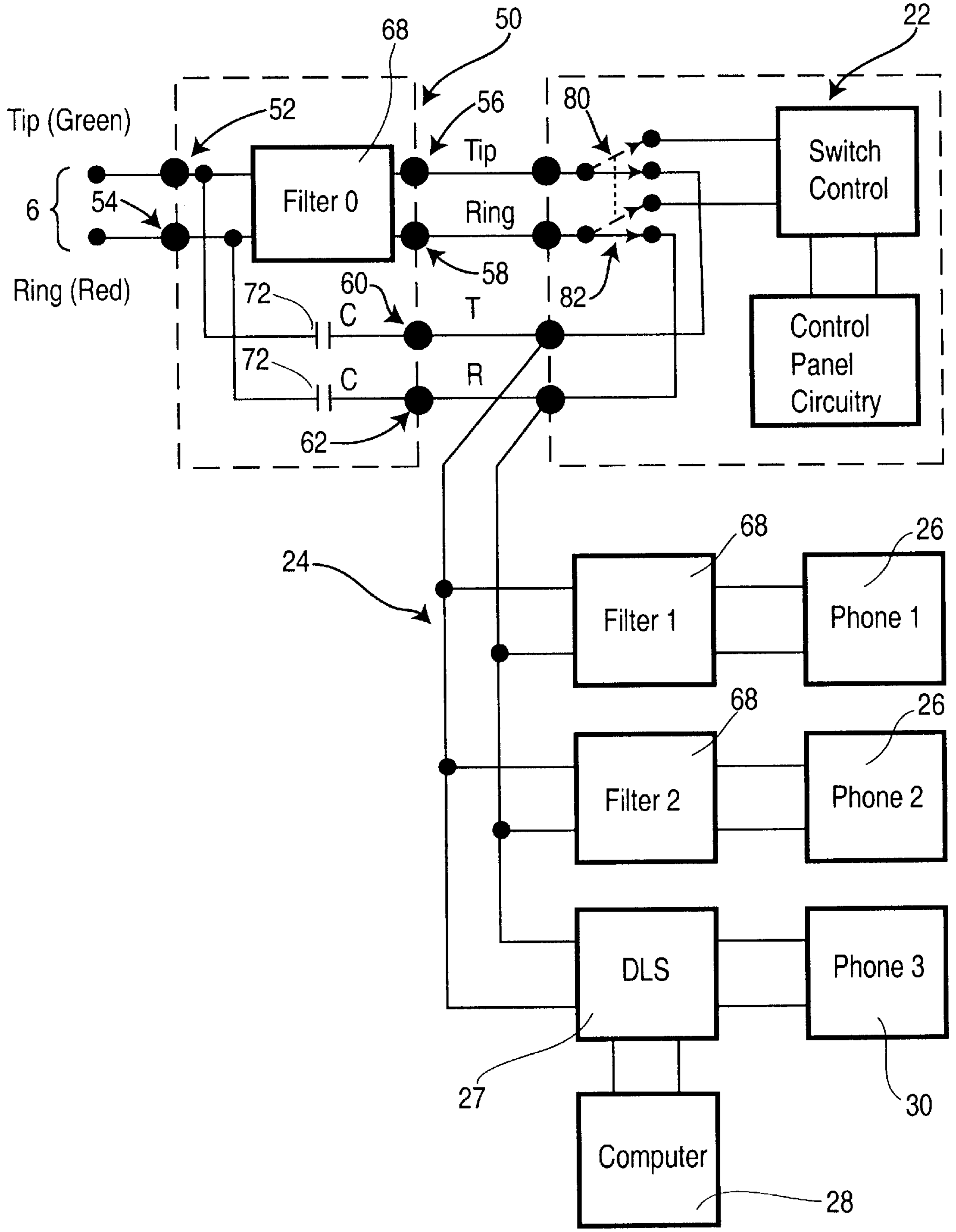
FIG. 2 is a schematic showing the bypass circuit in combination with a control panel both of which are connected to a household telephone service.

Details of the bypass arrangement are shown in FIG. 2. The bypass module 50 has Tip and Ring inputs 52 and 54 respectively for connecting to the two line telephone service 6. These Tip and Ring inputs are connected to AC noise filter 68 and to the Tip and Ring control panel outputs 56 and 58. These components collectively form a DC branch of the bypass module which passes the conventional DC audio telephone signal. This conventional signal is in the frequency range of less than 4000 Hz and is the signal fed to the control panel 22 in the conventional manner.

The bypass module 50 includes an AC branch 70 which is connected to the Tip and Ring inputs 52 and 54. The AC branch 70 includes two capacitors 72 for blocking the DC component. The output of the AC branch is provided to the Tip and Ring high frequency high outputs 60 and 62.

The control panel 22 had inputs and outputs such that the control panel is placed in series with the telephone service. The bypass module is located upstream of the control panel 22 and divides the telephone service into a low frequency DC component which is fed to the control panel and a high frequency AC component which bypasses the control panel and is provided to the household telephone network 24. In the normal mode of the control panel, the DC component is also provided to the household telephone network 24.

The control panel 22 in its conventional manner has a pair of inline switches 80 and 82 which in the position shown, connect the household telephone network 24 to the two line telephone service 6. These switches in the second position allow the control panel to seize the telephone line with respect to the low frequency DC component and disconnect any of the conventional phones or other conventional telephone devices on the network 24 from the two line service 6.

The signal bypass module 50 continues to provide the high frequency AC signal to or from the telephone service 6 to the household telephone network 24. In this way, the DSL modem 27 connected to the network 24 remains in continuous contact with the two line service 6 regardless of the state of the control panel 22. The security alarm panel 22 includes control panel logic 23 for communicating with the various detectors 40, and identifying events to be reported to a remote monitoring station. This control logic provides signal to the switch control 25 which determines the position of the line switches 80 and 82. In this way, the control panel 22 can communicate over the telephone system in the conventional manner with a remote security monitoring station.

With the system as shown in FIG. 2, if the computer 28 is downloading files from a remote computer connected to the telephone service 6, this downloaded information is transmitted through the high frequency branch and is unaffected by the state of the control panel and the state of the switches 80 and 82. The various phones including phone 30 will not operate if the control panel has seized the low frequency DC component of the line. These telephones have been isolated from the service 6 by the line switches 80 and 82.

The conventional phones 26 have AC noise filters 68 block a high frequency noise component which is sometimes heard on the conventional phone 26 when a high frequency signal is present. This would be similar to the AC noise filter 68 provided in the bypass circuit. The bypass circuit 50 may or may not need this particular component depending upon the sensitivity of the control panel. The filter 68 provided as part of the bypass module is necessary for control panels which are sensitive to this additional noise component due to the dual capability of the line service. If this is not a problem for the control panel, the filter 68 is not required.

The filters 68 provided in front of the conventional phones 26 will continue to be required as the high frequency AC component is bypassing the control panel.

Figure 3:
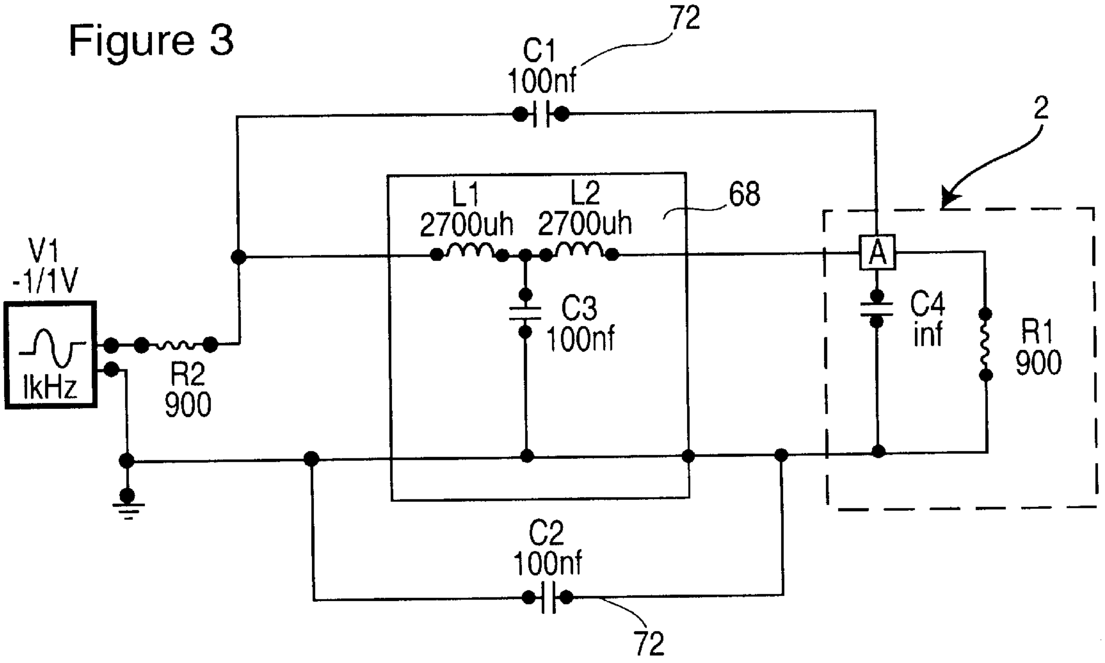
FIG. 3 is a circuit diagram of the signal bypass circuit as it cooperates with the filter on the DC branch of the circuit.
Figure 4:
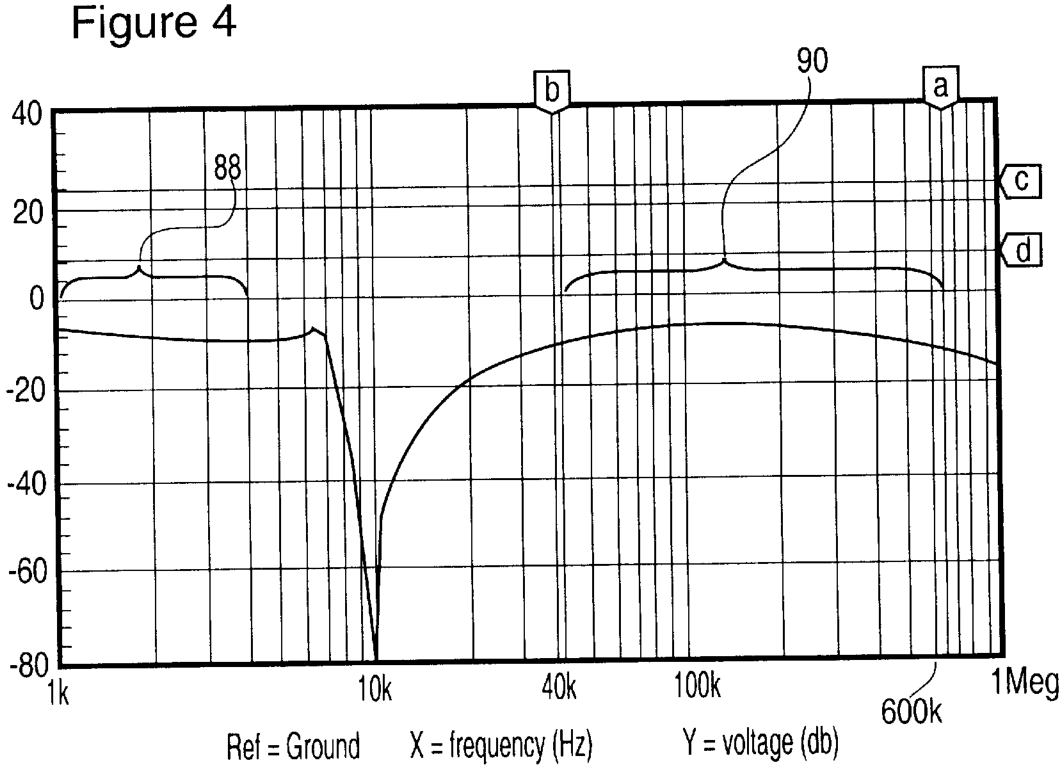
FIG. 4 is a graph showing the frequency response characteristics of the circuit of FIG. 3.

As can be appreciated from consideration of FIG. 2, the AC branch and the DC branch are in parallel, and the control panel is part of the DC branch. The capacitors 72 are shown in FIG. 3 in combination with the components of the AC noise filter 68. The circuit of FIG. 3 also assumes certain resistance and capacitance resistance of the network 24. The capacitors 72 are selected such that the bypass circuit when placed in combination with the control panel and a telephone network 24 provides a frequency response where it transmits the DC component with frequencies of less than 4000 Hz with little or no distortion as shown in FIG. 4, in combination with the transmission of the high frequency AC component indicated as 90 in a generally undistorted state.

The portion of the signal between 4000 Hz and 60,000 Hz is distorted but is not used as part of the frequency range of the conventional audio telephone signal nor is it part of the frequency range used in the high frequency data transmission range indicated as 90. This circuit has particular application with respect to DSL signals (digital subscriber line) whether these signals are asynchronous DSL signals (XDSL) or synchronous DSL signals. It is also apparent from FIG. 4 that the capacitors 72 are selected to provide the response characteristics such that a low frequency DC signal is transmitted without distortion as indicated by portion 88 in combination with a high frequency segment 90 (in this case 40 kHz–600 kHz) which is transmitted without any significant distortion. Any significant distortion is between these two ranges, and in this case, between the ranges of 4000 Hz and about 40,000 Hz. The circuit includes a resistance R1 to approximate the telephone network 24 and a resistance R2 to approximate the PSTN.

The blocking of the conventional DC component in the AC branch has been described with respect to the use of capacitor 72. This can also be accomplished through the use of high pass filters which block the low frequency component. The use of the capacitors is a practical cost effective approach.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A high frequency bypass circuit for a telephone line comprising Tip and Ring inputs, Tip and Ring security control panel outputs, Tip and Ring high frequency outputs for a local phone service, a DC branch connected to said Tip and Ring inputs conducting low frequency audio telephone signals to said Tip and Ring security control panel outputs, and an AC coupled high frequency branch connecting said Tip and Ring inputs to said Tip and Ring high frequency outputs, and wherein said AC coupled high frequency branch transmits DSL signals and blocks the transmission of low frequency audio telephone signals through said high frequency branch.

2. A high frequency bypass circuit as claimed in claim 1 wherein said DC branch includes a filter for blocking DSL signals.

3. A high frequency bypass circuit as claimed in claim 2 wherein said filter is a low pass filter which passes frequencies below 5 Khz.

4. A high frequency bypass circuit as claimed in claim 1, 2 or 3 wherein said high frequency branch includes capacitors for blocking said low frequency audio telephone signals.

5. A high frequency bypass circuit as claimed in claim 1, 2 or 3 wherein said high frequency branch includes a high frequency pass filter for blocking said low frequency audio telephone signals.

6. A security control panel comprising Ring and Tip inputs for connection to a telephone line for receiving DC low frequency telephone audio signals and AC high frequency telephone signals, a signal dividing circuit for conducting said DC low frequency telephone audio signals through a DC branch of said circuit and conducting said AC high frequency telephone signals through an AC branch of said circuit from said Tip and Ring inputs to Tip and Ring outputs of said control panel used to connect with a household telephone system, said control panel further including a communication module and a line seize switch arrangement, said line seize switch arrangement being controlled by said communication module, said line seize switch arrangement in one position connecting said Tip and Ring inputs with said Tip and Ring outputs and in a second position disconnecting said Tip and Ring inputs from said Tip and Ring outputs whereby AC high frequency telephone signals are conducted by said AC branch between said Tip and Ring inputs and outputs and DC low frequency telephone signals are selectively conducted between said Tip and Ring inputs and outputs depending upon the position of said line seize switch arrangement.

* * * * *